(12) United States Patent
Zhao et al.

(10) Patent No.: US 8,885,726 B2
(45) Date of Patent: Nov. 11, 2014

(54) NEIGHBOR MANAGEMENT FOR USE IN ENTROPY ENCODING AND METHODS FOR USE THEREWITH

(75) Inventors: Xu Gang (Wilf) Zhao, Toronto (CA); Xinghai Li, North York (CA); Jason Wang, Markham (CA)

(73) Assignee: ViXS Systems, Inc., Toronto, Ontario (CA)

( * ) Notice: Subject to any disclaimer, the term of this patent is extended or adjusted under 35 U.S.C. 154(b) by 1147 days.

(21) Appl. No.: 11/950,413

(22) Filed: Dec. 4, 2007

(65) Prior Publication Data

US 2009/0141804 A1    Jun. 4, 2009

(51) Int. Cl.
| | |
|---|---|
| H04N 7/12 | (2006.01) |
| H04N 11/02 | (2006.01) |
| H04N 11/04 | (2006.01) |
| H04N 19/61 | (2014.01) |
| H04N 19/51 | (2014.01) |
| H04N 19/423 | (2014.01) |
| H04N 19/436 | (2014.01) |

(52) U.S. Cl.
CPC ... *H04N 19/00696* (2013.01); *H04N 19/00781* (2013.01); *H04N 19/00484* (2013.01); *H04N 19/00521* (2013.01)
USPC ............ 375/240.23; 375/240.01; 375/240.12; 375/240.13; 375/240.16; 375/240.18; 375/240.2; 375/240.22

(58) Field of Classification Search
None
See application file for complete search history.

(56) References Cited

U.S. PATENT DOCUMENTS

| | | | |
|---|---|---|---|
| 6,885,702 B1* | 4/2005 | Goudezeune et al. ... | 375/240.12 |
| 2006/0098734 A1* | 5/2006 | Cho et al. ................. | 375/240.03 |
| 2006/0182181 A1* | 8/2006 | Lee et al. ................. | 375/240.24 |
| 2006/0233251 A1* | 10/2006 | Kim et al. ................. | 375/240.12 |
| 2006/0259747 A1* | 11/2006 | Gonzalez et al. ............ | 712/226 |
| 2007/0053443 A1* | 3/2007 | Song ........................ | 375/240.24 |
| 2007/0230582 A1* | 10/2007 | Chiu et al. ............... | 375/240.24 |
| 2007/0286286 A1* | 12/2007 | Heng et al. ............... | 375/240.16 |
| 2008/0137726 A1* | 6/2008 | Chatterjee et al. ........ | 375/240.01 |

* cited by examiner

*Primary Examiner* — Hassan Phillips
*Assistant Examiner* — Lonnie Sweet
(74) *Attorney, Agent, or Firm* — Garlick & Markison; Bruce E. Stuckman

(57) ABSTRACT

An entropy coding module is provided for use in a video encoder that encodes a video input signal based on a plurality of macroblocks derived from the video input signal. The entropy coding module includes an entropy coder that generates entropy encoded data from discrete transformed coefficients for the plurality of macroblocks. A neighbor management module stores neighbor data for at least one macroblock of the plurality of macroblocks for retrieval by the entropy encoder, when operating on at least one neighboring macroblock of the plurality of macroblocks.

15 Claims, 10 Drawing Sheets

NEIGHBOR MANAGEMENT FOR USE IN ENTROPY ENCODING AND METHODS FOR USE THEREWITH

TECHNICAL FIELD OF THE INVENTION

The present invention relates to filtering and encoding used in devices such as video encoders/codecs.

DESCRIPTION OF RELATED ART

Video encoding has become an important issue for modern video processing devices. Robust encoding algorithms allow video signals to be transmitted with reduced bandwidth and stored in less memory. However, the accuracy of these encoding methods face the scrutiny of users that are becoming accustomed to greater resolution and higher picture quality. Standards have been promulgated for many encoding methods including the H.264 standard that is also referred to as MPEG-4, part 10 or Advanced Video Coding, (AVC). While this standard sets forth many powerful techniques, further improvements are possible to improve the performance and speed of implementation of such methods.

Further limitations and disadvantages of conventional and traditional approaches will become apparent to one of ordinary skill in the art through comparison of such systems with the present invention.

DETAILED DESCRIPTION OF THE INVENTION INCLUDING THE PRESENTLY PREFERRED EMBODIMENTS

Figure 1:
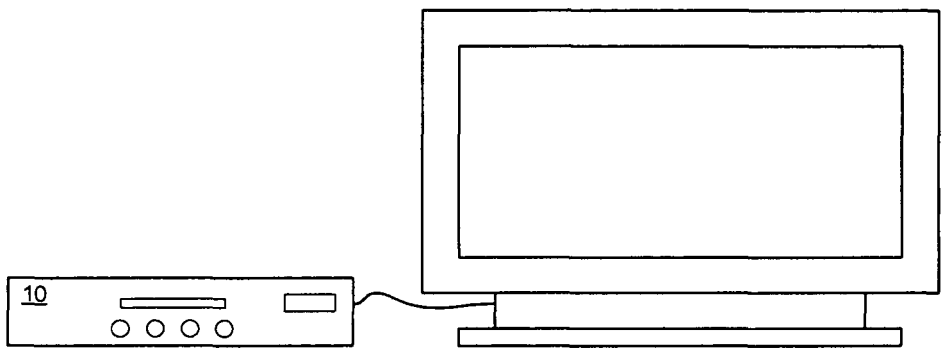
FIGS. 1-3 present pictorial diagram representations of a various video processing devices in accordance with embodiments of the present invention.
Figure 2:
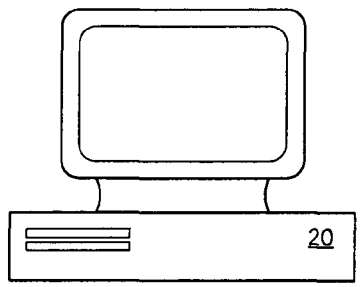
Figure 3:
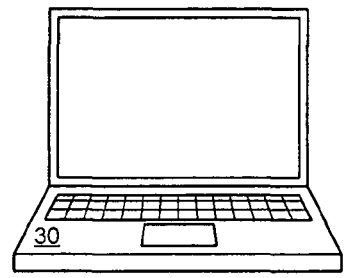

FIGS. 1-3 present pictorial diagram representations of a various video processing devices in accordance with embodiments of the present invention. In particular, set top box 10 with built-in digital video recorder functionality or a stand alone digital video recorder, computer 20 and portable computer 30 illustrate electronic devices that incorporate a video processing device 125 that includes one or more features or functions of the present invention. While these particular devices are illustrated, video processing device 125 includes any device that is capable of encoding video content in accordance with the methods and systems described in conjunction with FIGS. 4-12 and the appended claims.

Figure 4:
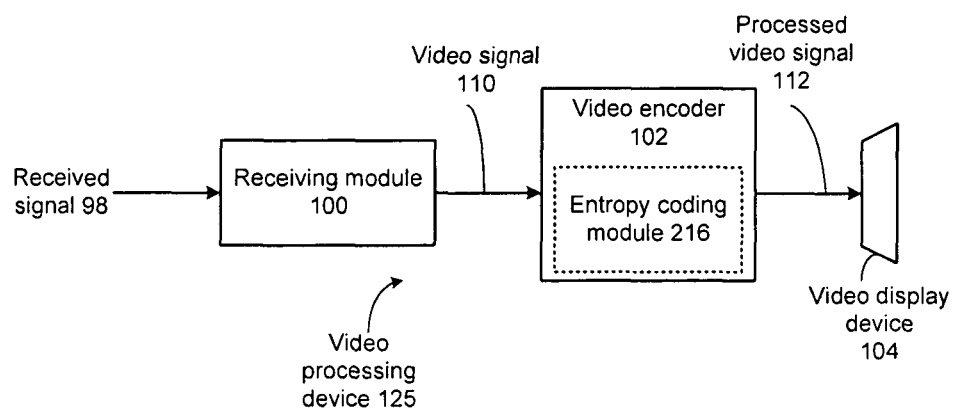
FIG. 4 presents a block diagram representation of a video processing device 125 in accordance with an embodiment of the present invention.

FIG. 4 presents a block diagram representation of a video processing device 125 in accordance with an embodiment of the present invention. In particular, video processing device 125 includes a receiving module 100, such as a television receiver, cable television receiver, satellite broadcast receiver, broadband modem, 3G transceiver or other information receiver or transceiver that is capable of receiving a received signal 98 and extracting one or more video signals 110 via time division demultiplexing, frequency division demultiplexing or other demultiplexing technique. Video encoding module 102 is coupled to the receiving module 100 to encode or transcode the video signal in a format corresponding to video display device 104.

In an embodiment of the present invention, the received signal 98 is a broadcast video signal, such as a television signal, high definition televisions signal, enhanced high definition television signal or other broadcast video signal that has been transmitted over a wireless medium, either directly or through one or more satellites or other relay stations or through a cable network, optical network or other transmission network. In addition, received signal 98 can be generated from a stored video file, played back from a recording medium such as a magnetic tape, magnetic disk or optical disk, and can include a streaming video signal that is transmitted over a public or private network such as a local area network, wide area network, metropolitan area network or the Internet.

Video signal 110 can include an analog video signal that is formatted in any of a number of video formats including National Television Systems Committee (NTSC), Phase Alternating Line (PAL) or Sequentiel Couleur Avec Memoire (SECAM). Processed video signal includes 112 a digital video codec standard such as H.264, MPEG-4 Part 10 Advanced Video Coding (AVC) or other digital format such as a Motion Picture Experts Group (MPEG) format (such as MPEG1, MPEG2 or MPEG4), Quicktime format, Real Media format, Windows Media Video (WMV) or Audio Video Interleave (AVI), or another digital video format, either standard or proprietary.

Video display devices 104 can include a television, monitor, computer, handheld device or other video display device that creates an optical image stream either directly or indirectly, such as by projection, based on decoding the processed video signal 112 either as a streaming video signal or by playback of a stored digital video file.

Video encoder 102 includes an entropy coding module 216 that operates in accordance with the present invention and, in particular, includes many optional functions and features described in conjunction with FIGS. 5-12 that follow.

Figure 5:
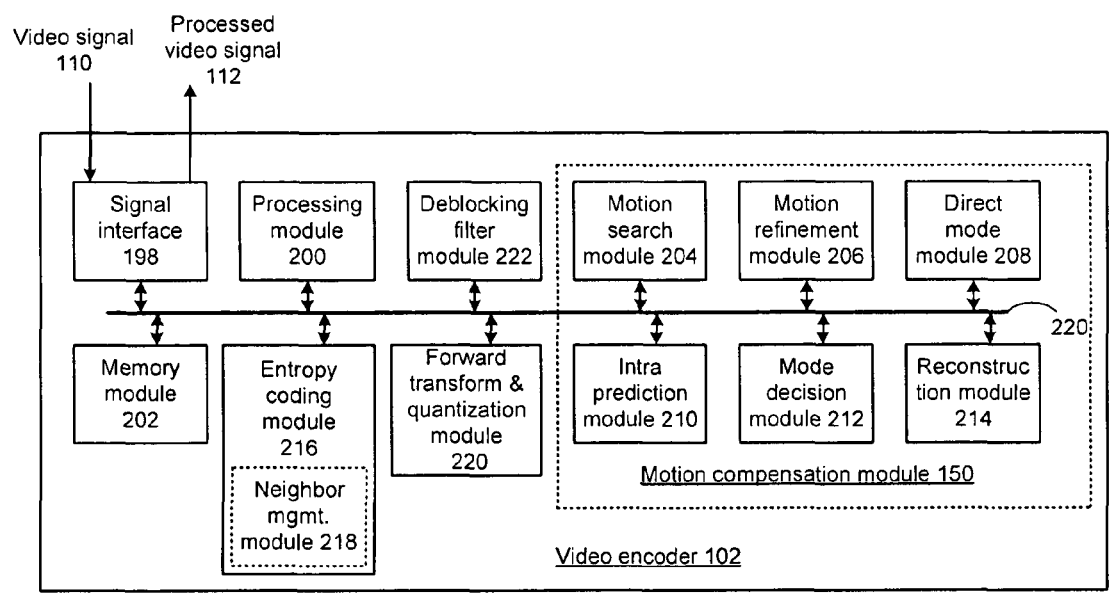
FIG. 5 presents a block diagram representation of a video encoder 102 that includes entropy coding module 216 in accordance with an embodiment of the present invention.

FIG. 5 presents a block diagram representation of a video encoder 102 that includes entropy coding module 216 in accordance with an embodiment of the present invention. In particular, video encoder 102 operates in accordance with many of the functions and features of the H.264 standard, the MPEG-4 standard, VC-1 (SMPTE standard 421M) or other standard, to encode a video input signal 110 that is converted to a digital format via a signal interface 198.

The video encoder 102 includes a processing module 200 that can be implemented using a single processing device or a plurality of processing devices. Such a processing device may be a microprocessor, co-processors, a micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory, such as memory module 202. Memory module 202 may be a single memory device or a plurality of memory devices. Such a memory device can include a hard disk drive or other disk drive, read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

Processing module 200, and memory module 202 are coupled, via bus 220, to the signal interface 198 and a plurality of other modules, such as motion search module 204, motion refinement module 206, direct mode module 208, intra-prediction module 210, mode decision module 212, reconstruction module 214, entropy coding module 216 that includes neighbor management module 218, forward transform and quantization module 220 and deblocking filter module 222. The modules of video encoder 102 can be implemented in software, firmware or hardware, depending on the particular implementation of processing module 200. It should also be noted that the software implementations of the present invention can be stored on a tangible storage medium such as a magnetic or optical disk, read-only memory or random access memory and also be produced as an article of manufacture. While a particular bus architecture is shown, alternative architectures using direct connectivity between one or more modules and/or additional busses can likewise be implemented in accordance with the present invention.

Motion compensation module 150 includes a motion search module 204 that processes pictures from the video input signal 110 based on a segmentation into macroblocks of pixel values, such as of 16 pixels by 16 pixels size, from the columns and rows of a frame and/or field of the video input signal 110. In an embodiment of the present invention, the motion search module determines, for each macroblock or macroblock pair of a field and/or frame of the video signal one or more motion vectors (depending on the partitioning of the macroblock into subblocks as described further in conjunction with FIG. 8) that represents the displacement of the macroblock (or subblock) from a reference frame or reference field of the video signal to a current frame or field. In operation, the motion search module operates within a search range to locate a macroblock (or subblock) in the current frame or field to an integer pixel level accuracy such as to a resolution of 1-pixel. Candidate locations are evaluated based on a cost formulation to determine the location and corresponding motion vector that have a most favorable (such as lowest) cost.

In an embodiment of the present invention, a cost formulation is based on the sum of the Sum of Absolute Difference (SAD) between the reference macroblock and candidate macroblock pixel values and a weighted rate term that represents the number of bits required to be spent on coding the difference between the candidate motion vector and either a predicted motion vector (PMV) that is based on the neighboring macroblock to the left of the current macroblock and on motion vectors from neighboring current macroblocks of a prior row of the video input signal or an estimated predicted motion vector that is determined based on motion vectors from neighboring current macroblocks of a prior row of the video input signal. In addition, the cost calculation may or may not use neighboring subblocks within the current macroblock.

A motion refinement module 206 generates a refined motion vector for each macroblock of the plurality of macroblocks, based on the motion search motion vector. In an embodiment of the present invention, the motion refinement module determines, for each macroblock or macroblock pair of a field and/or frame of the video input signal 110 a refined motion vector that represents the displacement of the macroblock from a reference frame or reference field of the video signal to a current frame or field. In operation, the motion refinement module refines the location of the macroblock in the current frame or field to a greater pixel level accuracy such as to a resolution of ¼-pixel. Candidate locations are also evaluated based on a cost formulation to determine the location and refined motion vector that have a most favorable (such as lowest) cost. As in the case with the motion search module, a cost formulation is based on the sum of the Sum of Absolute Difference (SAD) between the reference macroblock and candidate macroblock pixel values and a weighted rate term that represents the number of bits required to be spent on coding the difference between the candidate motion vector and either a predicted motion vector (PMV) that is based on the neighboring macroblock to the left of the current macroblock and on motion vectors from neighboring current macroblocks of a prior row of the video input signal or an estimated predicted motion vector that is determined based on motion vectors from neighboring current macroblocks of a prior row of the video input signal. In addition, the cost calculation can avoid the use of neighboring subblocks within the current macroblock. In this fashion, motion refinement module 206 is able to operate on a macroblock to contemporaneously determine the motion search motion vector for each subblock of the macroblock.

It should be noted that when estimated predicted motion vectors are used the cost formulation can avoid the use of motion vectors from the current row and both the motion search module 204 and the motion refinement module 206 can operate in a pipelined fashion and in parallel on an entire row of video input signal 110, to contemporaneously determine the refined motion vector for each macroblock in the row.

A direct mode module 208 generates a direct mode motion vector for each macroblock of the plurality of macroblocks, based on a plurality of macroblocks that neighbor the macroblock of pixels. In an embodiment of the present invention, the direct mode module 208 operates in a fashion such as defined by the H.264 standard to determine the direct mode motion vector and the cost associated with the direct mode motion vector.

While the prior modules have focused on inter-prediction of the motion vector, intra-prediction module 210 generates a best intra prediction mode for each macroblock of the plurality of macroblocks. In particular, intra-prediction module 210 operates in a fashion such as defined by the H.264 standard to evaluate a plurality of intra prediction modes, based on motion vectors determined from neighboring macroblocks to determine the best intra prediction mode and the associated cost.

A mode decision module 212 determines a final motion vector for each macroblock of the plurality of macroblocks based on costs associated with the refined motion vector, the direct mode motion vector, and the best intra prediction mode, and in particular, the method that yields the most favorable (lowest) cost, or otherwise an acceptable cost. A reconstruction module 214 generates residual luma and chroma pixel values corresponding to the final motion vector for each macroblock of the plurality of macroblocks.

A forward transform and quantization module 220 of video encoder 102 generates processed video signal 112 by transforming coding and quantizing the residual pixel values into quantized transformed coefficients that can be further coded, such as by entropy coding in entropy coding module 216, filtered by de-blocking filter module 222 and output as the processed video signal 112 via signal interface 198 to be transmitted and/or stored.

As discussed above, the entropy coding module 216 generates entropy coded data by coding the quantized transformed coefficients. In an embodiment of the present invention the entropy coding module 216 performs context-adaptive binary arithmetic coding (CABAC), context-adaptive variable-length coding (CAVLC) or other entropy encoding to generate the entropy encoded data based on based on neighbor data from neighboring macroblocks. In particular, entropy coding module 216 includes a neighbor management module 218 that generates and/or stores neighbor data for at least one macroblock of the plurality of macroblocks for retrieval by the entropy coding module 216 when operating on at least one neighboring macroblock of the plurality of macroblocks. As the entropy coded data is finalized for a macroblock, neighbor data is stored for use in the processing of neighboring macroblocks that have yet to be processed, yet that will require the use of such data. In addition, neighboring data is also stored for the processing of future pictures, such as future frames and/or fields of video input signal 110.

In an embodiment of the present invention, a data structure, such as a linked list, array or one or more registers are used to associate and store neighbor data for each macroblock. Neighbor data can include motion vector differences (MVD), macroblock types, quantization parameter delta, inter predication type, and optionally motion vectors, reference indices, quantization parameters, coded-block patterns, macroblock types, intra/inter prediction module types, neighboring pixel values and or other data from neighboring macroblocks and/or subblocks used to the entropy coding module 216 or by one or more of the other modules or procedures of the present invention, to calculate results for a current macroblock.

Consider the example where a particular macroblock MB(x,y) requires neighbor data from macroblocks MB(x−1, y−1), MB(x, y−1), MB (x+1,y−1) and MB(x−1,y). In prior art codecs, the preparation of the neighbor data needs to calculate the location of the relevant neighbor sub-blocks. However, the calculation is not as straightforward as it was in conventional video coding standards. For example, in H.264 coding, the support of multiple partition types make the size and shape for the subblocks vary significantly. Furthermore, the support of the macroblock adaptive frame and field (MBAFF) coding allows the macroblocks to be either in frame or in field mode. For each mode, one neighbor derivation method is defined in H.264. So the calculation needs to consider each mode accordingly. In addition, in order to get all of the neighbor data required, the derivation needs to be invoked four times since there are four neighbors involved—MB(x−1, y−1), MB(x, y−1), MB(x+1, y−1), and MB(x−1, y). So the encoding of the current macroblock MB(x, y) cannot start until the location of the four neighbors has been determined and their data have been fetched from memory.

The present invention avoids the above problems. In particular when each macroblock is processed and final motion vectors and encoded data are determined, neighbor data is stored in data structures for each neighboring macroblock that will need this data. Since the neighbor data is prepared in advance, the current macroblock MB(x,y) can start right away when it is ready to be processed. The burden of pin-pointing neighbors is virtually re-allocated to its preceding macroblocks. The encoding of macroblocks can be therefore be more streamline and faster. In other words, when the final motion vectors are determined for MB(x−1,y−1), neighbor data is stored for each neighboring macroblock that is yet to be processed, including MB(x,y) and also other neighboring macroblocks such as MB(x, y−1), MB(x−2,y) MB(x−1,y). Similarly, when the final motion vectors are determined for MB(x,y−1), MB (x+1,y−1) and MB(x−1,y) neighbor data is stored for each neighboring macroblock corresponding to each of these macroblocks that are yet to be processed, including MB(x,y).

In this fashion, when MB(x,y) is ready to be processed, the neighbor data is already stored in a data structure that corresponds to this macroblock for fast retrieval. The entropy coding module 216 can then use retrieved neighbor data in entropy coding, each as set forth in the H.264 standard, the MPEG-4 standard, VC-1 (SMPTE standard 421M) or by other standard or other means. In an embodiment of the present invention, neighbor data is stored in a portion of memory module 202 such as a memory buffer, a ring buffer, a cache, or other memory structure or device that can store neighbor data when required for fast retrieval when require for processing neighboring macroblocks but then can be over-written, deleted or otherwise discarded after all of the neighboring macroblocks that may require each particular instance of neighbor data are through with the neighbor data.

While not expressly shown, video encoder 102 can include a memory cache, a memory management module, a comb filter or other video filter, and/or other module to support the encoding of video input signal 110 into processed video signal 112.

Figure 6:
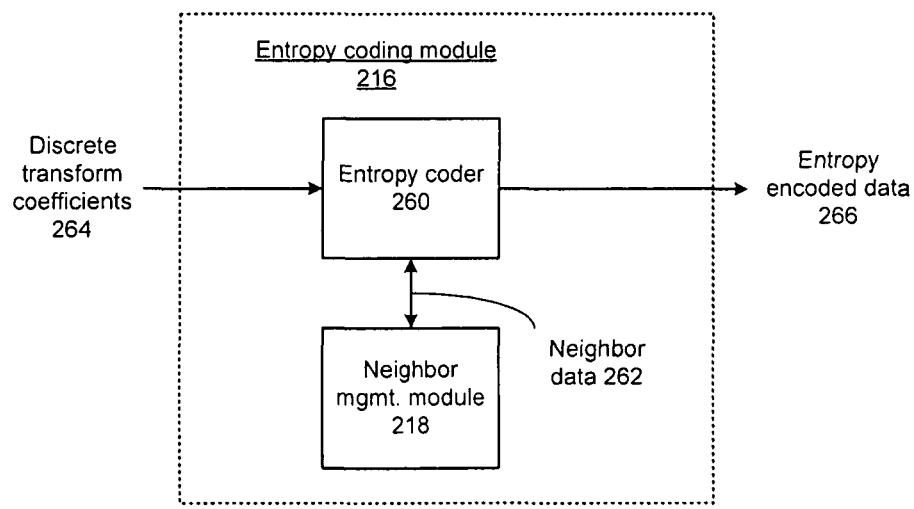
FIG. 6 presents a block diagram representation of an entropy coding module 216 in accordance with an embodiment of the present invention.

FIG. 6 presents a block diagram representation of an entropy coding module 216 in accordance with an embodiment of the present invention. In particular, entropy coding module 216 includes an entropy coder 260 that generates entropy encoded data 266 from discrete transformed coefficients 264 for a plurality of macroblocks of an image, such as a frame or field of a video input signal such as video signal 110.

Neighbor management module 218 is coupled to the entropy coder to store neighbor data 262 for at least one macroblock of the plurality of macroblocks for retrieval by the entropy encoder 260, when operating on at least one neighboring macroblock of the plurality of macroblocks. As discussed, entropy coding module 216 can generate entropy encoded data 266 from discrete transformed coefficients 264 in accordance with CABAC, CAVLC or other entropy coding. While neighbor management module is shown as being coupled to bus 220 via entropy coder, 260, neighbor management module 218 can likewise be coupled directly to bus 220 and/or coupled to entropy coder 260 through bus 220. In addition, while neighbor management module 218 has been described primarily in terms of its support of the entropy coding performed by entropy coding module 216, neighbor management module 216 can optionally store neighbor data in support of other modules/steps of video encoder 102 such as motion refinement module 206, motion search module 204, direct mode module 208, intra-prediction module 210, etc.

Figure 7:
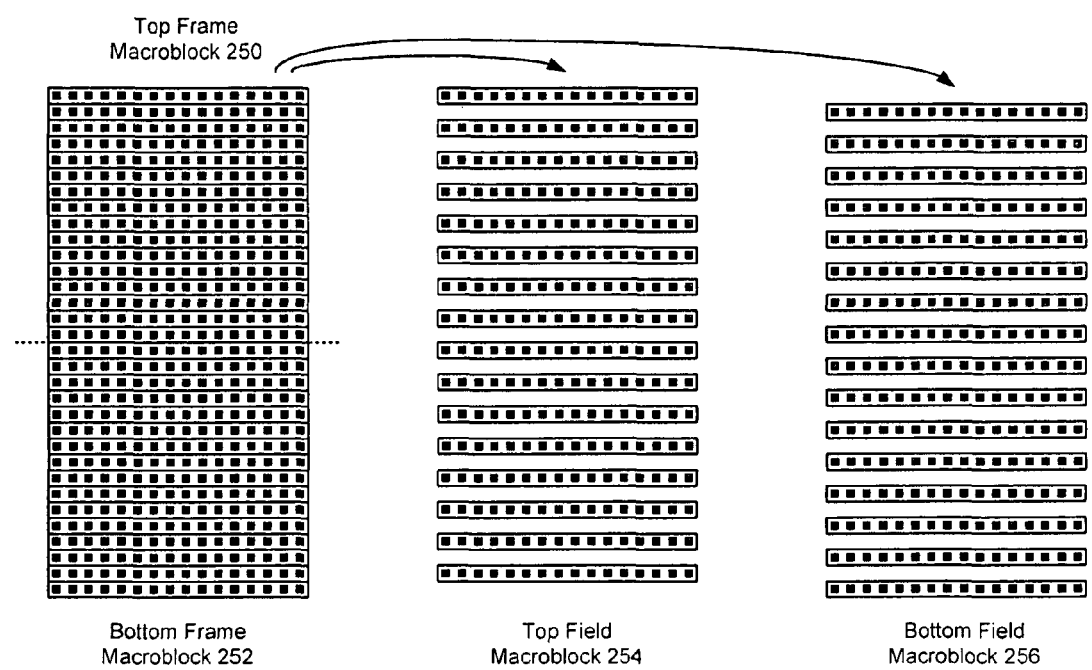
FIG. 7 presents a graphical representation of the relationship between example top frame and bottom frame macroblocks (250, 252) and example top field and bottom field macroblocks (254, 256) in accordance with an embodiment of the present invention.

FIG. 7 presents a graphical representation of the relationship between example top frame and bottom frame macroblocks (250, 252) and example top field and bottom field macroblocks (254, 256) in accordance with an embodiment of the present invention. In this embodiment, motion search module 204 generates a motion search motion vector for each macroblock of a plurality of macroblocks by contemporaneously evaluating a macroblock pair that includes a top frame macroblock 250 and bottom frame macroblock 252 from a frame of the video input signal 110 and a top field macroblock 254 and a bottom field macroblock 256 from corresponding fields of the video input signal 110.

Considering the example shown, each of the macroblocks are 16 pixels by 16 pixels in size. Motion search is performed in full pixel resolution, or other resolution, either coarser or finer, by comparing a candidate frame macroblock pair of a current frame that includes top frame macroblock 250 and bottom frame macroblock 252 to the macroblock pair of a reference frame. In addition, lines of a first parity (such as odd lines) from the candidate frame macroblock pair are grouped to form top field macroblock 254. Similarly, lines of a second parity (such as even lines) from the candidate frame macroblock pair are grouped to form bottom field macroblock 256. Motion search module 204 calculates a cost associated a plurality of lines, and generates a cost associated with the top frame macroblock 250 based on a cost accumulated for a plurality of top lines of the plurality of lines, generates a cost associated with the bottom frame macroblock 252 based on a cost accumulated for a plurality of bottom lines of the plurality of lines, generates a cost associated with the top field macroblock 254 based on a cost accumulated for a plurality of first-parity lines of the plurality of lines compared with either a top or bottom field reference, and generates a cost associated with the bottom field macroblock 256 based on a cost accumulated for a plurality of second-parity lines of the plurality of lines, also based on either a top or bottom field reference. In this fashion, six costs can be generated contemporaneously for the macroblock pair: top frame compared with top frame of the reference; bottom frame compared with the bottom frame of the reference; top field compared with top field of the reference; bottom field compared with the bottom field of the reference; top field compared with bottom field of the reference; and bottom field compared with the top field of the reference.

Each of these costs can be generated based on the sum of the absolute differences (SAD) of the pixel values of the current frame or field with the reference frame or field. The SADs can be calculated contemporaneously, in a single pass, based on the accumulation for each line. The overall SAD for a particular macroblock (top or bottom, frame or field) can be determined by totaling the SADs for the lines that make up that particular macroblock. Alternatively, the SADs can be calculated in a single pass, based on the smaller segments such as 4×1 segments that can be accumulated into subblocks, that in turn can be accumulated into overall macroblock totals. This alternative arrangement particularly lends itself to video encoders that operate based on the partitioning of macroblocks into smaller subblocks, as will be discussed further in conjunction with FIG. 7.

The motion search module 204 is particularly well adapted to operation in conjunction with macroblock adaptive frame and field processing. Frame mode costs for the current macroblock pair can be generated as discussed above. In addition, motion search module 204 optionally generates a field decision based on accumulated differences, such as SAD, between the current bottom field macroblock and a bottom field macroblock reference, the current bottom field macroblock and a top field macroblock reference, the current top field macroblock and the bottom field macroblock reference, and the current top field macroblock and the top field macroblock reference. The field decision includes determining which combination (top/top, bottom/bottom) or (top/bottom, bottom/top) yields a lower cost. Similarly, motion search module 204 can optionally choose either frame mode or field mode for a particular macroblock pair, based on whether the frame mode cost compares more favorably (e.g. are lower) or less favorably (e.g. higher) to the field mode cost, based on the field mode decision. In addition, other modules of motion compensation module 150, including entropy coding module 216, that operate on both frames and field can operate can similarly operate.

In particular, the neighbor management module 218 generates neighbor data that includes frame below neighbor data for retrieval by a neighboring macroblock in a row below the at least one macroblock when processing in frame mode and field below neighbor data for retrieval by the neighboring macroblock in a row below the at least one macroblock when processing in field mode. In addition, the neighbor data includes frame right neighbor data for retrieval by a neighboring macroblock to the right of the at least one macroblock when processing in field mode and field right neighbor data for retrieval by the neighboring macroblock to the right of the at least one macroblock when processing in field mode. In this fashion, the entropy coding module 216 can operate in either a frame or field mode and directly access either the frame mode neighbor data for frame mode neighbors above the macroblock of interest, the field mode neighbor data for field mode neighbors above the macroblock of interest, the frame mode neighbor data for the frame mode neighbor to the left of the macroblock of interest and/or the field mode neighbor data for the field mode neighbor to the left of the macroblock of interest.

As discussed, this information is stored in the processing of the prior macroblocks, whether the macroblocks themselves were processed in frame or in field mode, and can be accessed in the processing of the macroblock of interest by retrieval directly from memory and without a look-up table or further processing.

Figure 8:
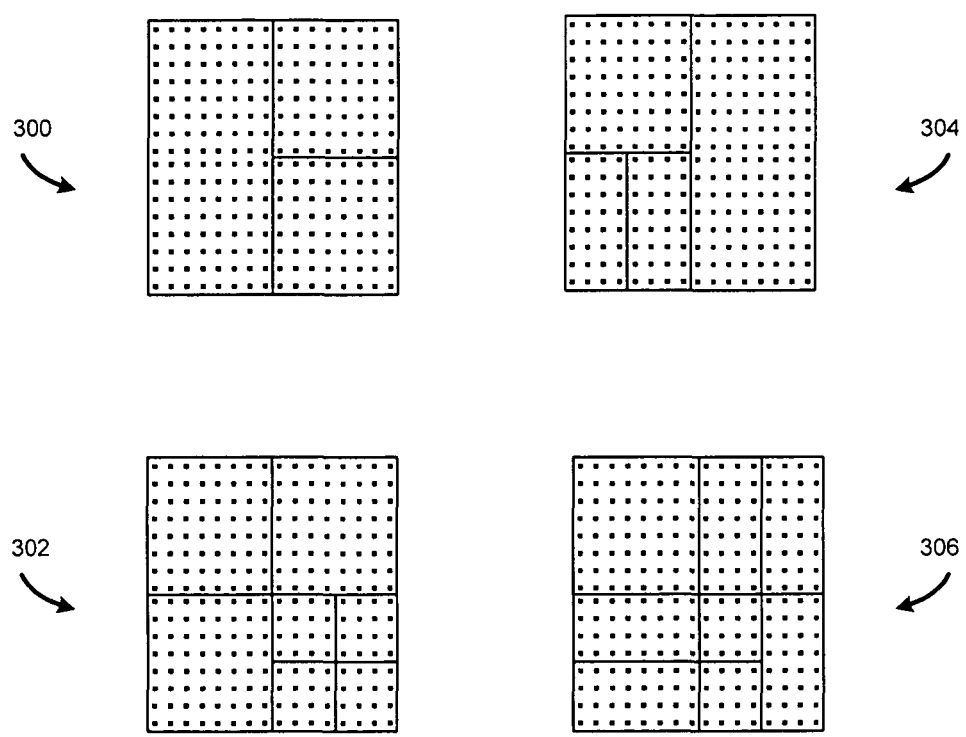
FIG. 8 presents a graphical representation that shows example macroblock partitioning in accordance with an embodiment of the present invention.

FIG. 8 presents a graphical representation of example partitionings of a macroblock of a video input signal into a plurality of subblocks. In particular, while the modules described in conjunction with FIG. 5 above can operate on macroblocks having a size such as 16 pixels×16 pixels, such as in accordance with the H.264 standard, macroblocks can be partitioned into subblocks of smaller size, as small as 4 pixels on a side with the functions and features described in conjunction with the macroblocks applying to each subblock with individual pixel locations indicated by dots. For example, motion search module 204 can generate separate motion search motion vectors for each subblock of each macroblock, etc.

Macroblock 302 represents an example of partitioning into subblocks in accordance with the H.264 standard. Macroblocks 300, 304 and 306 represent examples of other possible partitioning into subblocks. In particular, macroblock 300 is a 16×16 macroblock that is partitioned into an 8×16 subblock and two 8×8 subblocks. Macroblock 302 is a 16×16 macroblock that is partitioned into three 8×8 subblocks and four 4×4 subblocks. Macroblock 304 is a 16×16 macroblock that is partitioned into an 8×16 subblock, an 8×8 subblock and two 4×8 subblocks. Macroblock 306 is a 16×16 macroblock that is partitioned into an 8×8 subblock, three 4×8 subblocks, two 8×4 subblocks, and two 4×4 subblocks. The partitioning of the macroblocks into smaller subblocks increases the complexity of the motion compensation by requiring various compensation methods, such as the motion search to determine, not only the motion search motion vectors for each subblock, but the best motion vectors over the set of all possible partitions of a particular macroblock. The result however can yield more accurate motion compensation and reduced compression artifacts in the decoded video image.

Figure 9:
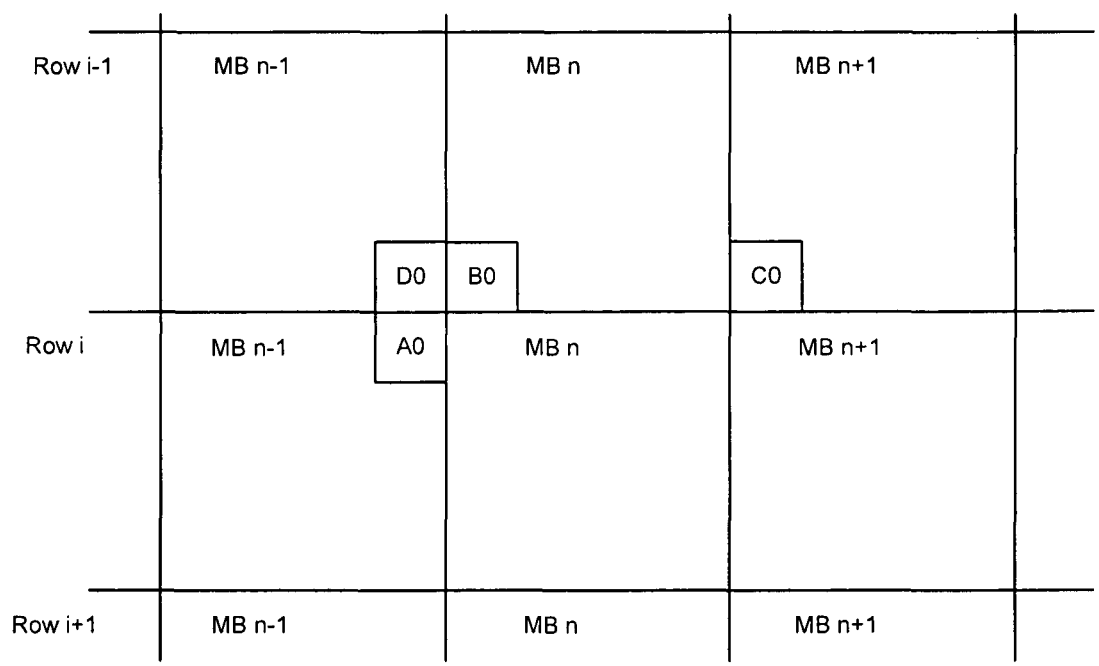
FIG. 9 presents a graphical representation of a plurality of macroblocks of a video input signal that shows an example of the neighboring macroblocks used in encoding of a particular macroblock.

FIG. 9 presents a graphical representation of a plurality of macroblocks of a video input signal that shows an example of the neighboring macroblocks used in motion compensation or encoding of a particular macroblock. Three macroblocks MB n−1, MB n and MB n+1 are show for three rows, row i−1, row i and row i+1 of a video input signal in either frame or field mode. The dots representing individual pixel locations have been omitted for clarity.

Consider for example, that video encoder 102 is operating on macroblock MB(n, i). Consider further, that the motion refinement module 206, motion search module 204, direct mode module 208, the intra-prediction module 210 and entropy coding module 216 may need the final motion vectors determined for 4×4 subblock D0 from MB(n−1, i−1), subblock B0 from MB(n, i−1), subblock C0 from MB(n+1, i−1), along with subblock A from MB(n−1, i). When MB(n−1, i−1) is processed, the motion vector for D0 is stored in a data structure associated with MB(n, i), along with the other neighbor data for other neighbors such as MB(n, i−1), MB(n−2, i) and MB(n−1, i). When MB(n, i−1) is processed, the motion vector for B0 is stored in a data structure associated with MB(n, i) along with the other neighbor data for other neighbors. When MB(n+1, i−1) is processed, the motion vector for C0 is stored in a data structure associated with MB(n, i) along with the other neighbor data for other neighbors. And when MB(n−1, i) is processed, the motion vector for D0 is stored in a data structure associated with MB(n, i) along with the other neighbor data for other neighbors. In this fashion, when MB (n, i) is processed, any of the necessary neighbor data can be easily retrieved from the data structure.

While the above discussion relates to the processing in either frame of field mode, as discussed in conjunction with FIG. 6, both frame and field mode neighbor data can be stored for later retrieval, as needed, in the processing of neighboring macroblocks. Further, while the above discussion focuses on individual macroblocks, neighbor data based on the processing or macroblock pairs can also be stored, with, for instance, neighbor data used by the bottom macroblock that is derived from the top macroblock within the macroblock pair being generated directly in the processing of the macroblock pair.

Figure 10:
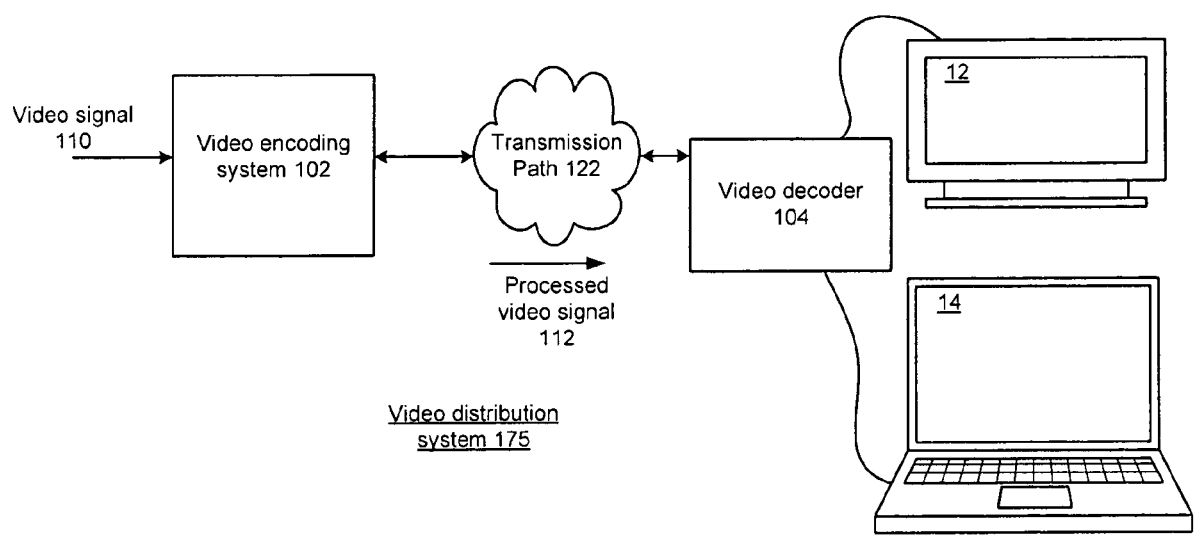
FIG. 10 presents a block diagram representation of a video distribution system 175 in accordance with an embodiment of the present invention.

FIG. 10 presents a block diagram representation of a video distribution system 175 in accordance with an embodiment of the present invention. In particular, processed video signal 112 is transmitted via a transmission path 122 to a video decoder 104. Video decoder 104, in turn can operate to decode the processed video signal 112 for display on a display device such as television 10, computer 20 or other display device.

The transmission path 122 can include a wireless path that operates in accordance with a wireless local area network protocol such as an 802.11 protocol, a WIMAX protocol, a Bluetooth protocol, etc. Further, the transmission path can include a wired path that operates in accordance with a wired protocol such as a Universal Serial Bus protocol, an Ethernet protocol or other high speed protocol.

Figure 11:
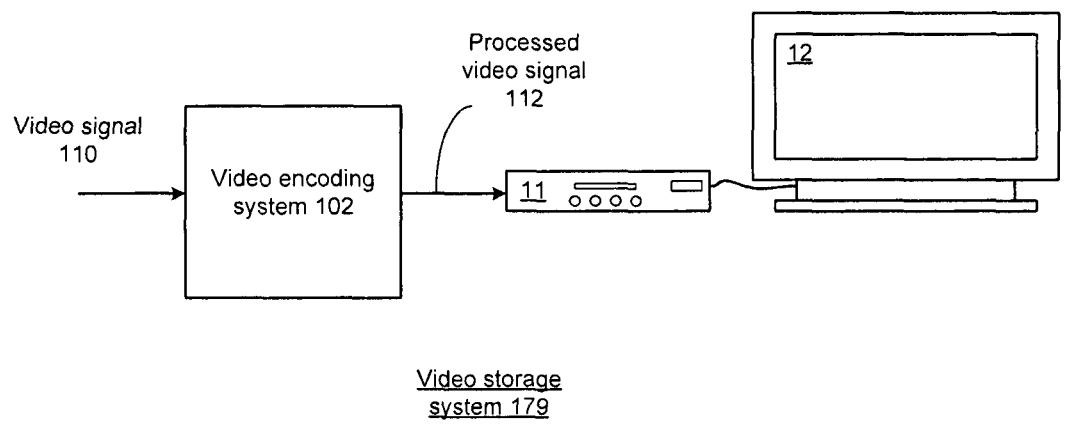
FIG. 11 presents a block diagram representation of a video storage system 179 in accordance with an embodiment of the present invention.

FIG. 11 presents a block diagram representation of a video storage system 179 in accordance with an embodiment of the present invention. In particular, device 11 is a set top box with built-in digital video recorder functionality, a stand alone digital video recorder, a DVD recorder/player or other device that stores the processed video signal 112 for display on video display device such as television 12. While video encoder 102 is shown as a separate device, it can further be incorporated into device 11. While these particular devices are illustrated, video storage system 179 can include a hard drive, flash memory device, computer, DVD burner, or any other device that is capable of generating, storing, decoding and/or displaying the video content of processed video signal 112 in accordance with the methods and systems described in conjunction with the features and functions of the present invention as described herein.

Figure 12:
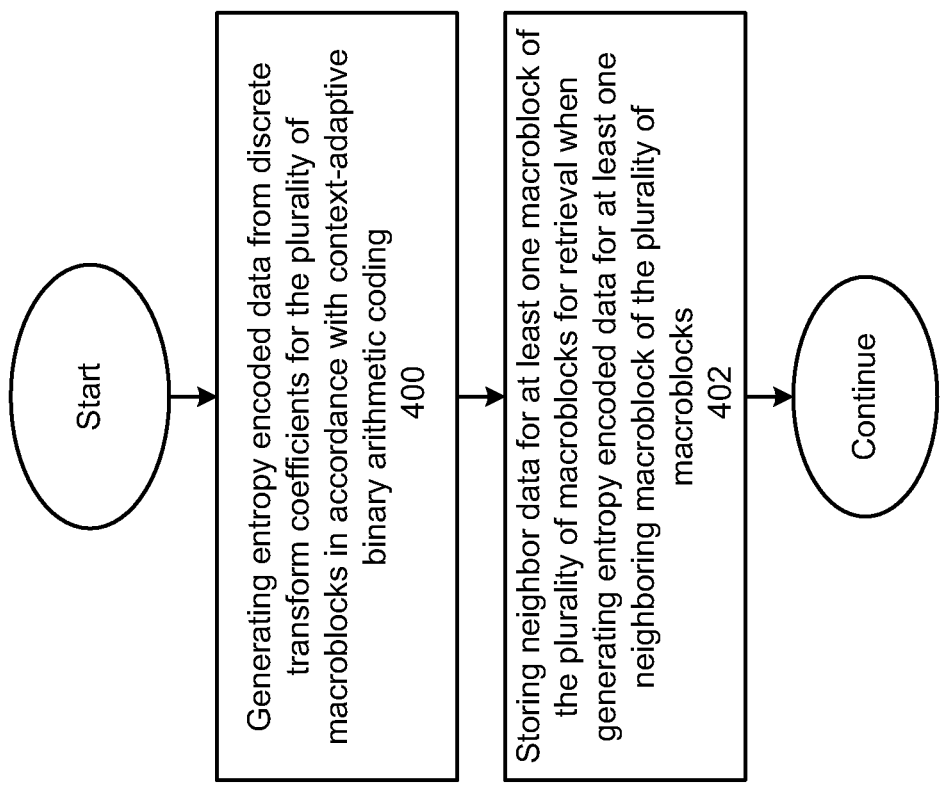
FIG. 12 presents a flowchart representation of a method in accordance with an embodiment of the present invention.

FIG. 12 presents a flowchart representation of a method in accordance with an embodiment of the present invention. In particular, a method is presented for use in conjunction with one or more of the features and functions described in association with FIGS. 1-11. In step 400, entropy encoded data is generated from discrete transformed coefficients for the plurality of macroblocks in accordance with context-adaptive binary arithmetic coding. In step 402, neighbor data is stored for at least one macroblock of the plurality of macroblocks for retrieval when generating entropy encoded data for at least one neighboring macroblock of the plurality of macroblocks.

In an embodiment of the present invention, step 402 stores neighbor data based on macroblock pairs that include a top frame macroblock and bottom frame macroblock from a frame of the video input signal and a top field macroblock and a bottom field macroblock from a corresponding field of the video input signal. The neighbor data can include frame below neighbor data for retrieval by a neighboring macroblock in a row below the at least one macroblock when processing in a frame mode and field below neighbor data for retrieval by the neighboring macroblock in a row below the at least one macroblock when processing in a field mode. The neighbor data can includes frame right neighbor data for retrieval by a neighboring macroblock to the right of the at least one macroblock when processing in frame mode and field right neighbor data for retrieval by the neighboring macroblock to the right of the at least one macroblock when processing in field mode.

As discussed above, the video encoder, such as video encoder 102, can operate in accordance with at least one of, an Advanced Video Coding (AVC) format and a Motion Picture Experts Group (MPEG) format. Step 400 can generate entropy encoded data from discrete transformed coefficients for the plurality of macroblocks in accordance with context-adaptive binary arithmetic coding.

In preferred embodiments, the various circuit components are implemented using 0.35 micron or smaller CMOS technology. Provided however that other circuit technologies, both integrated or non-integrated, may be used within the broad scope of the present invention.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As the term module is used in the description of the various embodiments of the present invention, a module includes a functional block that is implemented in hardware, software, and/or firmware that performs one or module functions such as the processing of an input signal to produce an output signal. As used herein, a module may contain submodules that themselves are modules.

Thus, there has been described herein an apparatus and method, as well as several embodiments including a preferred embodiment, for implementing a video encoder and entropy coder with neighbor management for use therewith. Various embodiments of the present invention herein-described have features that distinguish the present invention from the prior art.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. An entropy coding module for use in a video encoder that encodes a video input signal based on a plurality of macroblocks derived from the video input signal, the entropy coding module comprising:
   a neighbor management module that stores neighbor data for one macroblock of the plurality of macroblocks in a plurality of data structures associated with each of a corresponding plurality of neighboring macroblocks, wherein the neighbor management module stores neighbor data based on macroblock pairs that include a top frame macroblock and bottom frame macroblock from a frame of the video input signal and a top field macroblock and a bottom field macroblock from a corresponding field of the video input signal; and
   an entropy coder, coupled to the neighbor management module, that generates entropy encoded data from discrete transformed coefficients for the plurality of macroblocks, based on the neighbor data, wherein the entropy encoder retrieves the neighbor data for a selected macroblock directly from the neighbor management module from a single one of the plurality of data structures that corresponds to the selected macroblock.

2. The entropy coding module of claim 1 wherein neighbor data includes frame below neighbor data for retrieval by a neighboring macroblock in a row below the at least one macroblock when processing in a frame mode and field below neighbor data for retrieval by the neighboring macroblock in a row below the at least one macroblock when processing in a field mode.

3. The entropy coding module of claim 1 wherein neighbor data includes frame right neighbor data for retrieval by a neighboring macroblock right of the at least one macroblock when processing in frame mode and field right neighbor data for retrieval by the neighboring macroblock right of the at least one macroblock when processing in field mode.

4. The entropy coding module of claim 1 wherein the entropy coder generates the entropy encoded data from discrete transformed coefficients in accordance with context-adaptive binary arithmetic coding.

5. The entropy coding module of claim 1 wherein the video encoder operates in accordance with at least one of, an Advanced Video Coding (AVC) format and a Motion Picture Experts Group (MPEG) format.

6. The entropy coding module of claim 1 wherein each one of the plurality of data structures stores copies of all neighbor data for a corresponding one of the plurality of neighboring macroblocks.

7. An entropy coding module for use in a video encoder that encodes a video input signal based on a plurality of macroblocks derived from the video input signal, the entropy coding module comprising:
   a neighbor management module that stores neighbor data for each macroblock of the plurality of macroblocks in a plurality of data structures associated with each of a corresponding plurality of neighboring macroblocks, wherein the neighbor management module stores neighbor data based on macroblock pairs that include a top frame macroblock and bottom frame macroblock from a frame of the video input signal and a top field macroblock and a bottom field macroblock from a corresponding field of the video input signal; and
   an entropy coder, coupled to the neighbor management module, that generates entropy encoded data from discrete transformed coefficients for the plurality of macroblocks in accordance with context-adaptive binary arithmetic coding based on the neighbor data, wherein the entropy encoder retrieves the neighbor data for a selected macroblock directly from the neighbor management module from a single one of the plurality of data structures that corresponds to the selected macroblock.

8. The entropy coding module of claim 7 wherein neighbor data includes frame below neighbor data for retrieval by a neighboring macroblock in a row below the at least one macroblock when processing in a frame mode and field below neighbor data for retrieval by the neighboring macroblock in a row below the at least one macroblock when processing in a field mode.

9. The entropy coding module of claim 7 wherein neighbor data includes frame right neighbor data for retrieval by a neighboring macroblock right of the at least one macroblock when processing in frame mode and field right neighbor data for retrieval by the neighboring macroblock right of the at least one macroblock when processing in field mode.

10. The entropy coding module of claim 7 wherein the video encoder operates in accordance with at least one of, an Advanced Video Coding (AVC) format and a Motion Picture Experts Group (MPEG) format.

11. A method for use in a video encoder that encodes a video input signal based on a plurality of macroblocks derived from the video input signal, the method comprising:
   generating entropy encoded data from discrete transformed coefficients for the plurality of macroblocks in accordance with context-adaptive binary arithmetic coding based on neighbor data for each of the plurality of macroblocks; and storing the neighbor data for each of the plurality of macroblocks in a plurality of data structures associated with each of a corresponding plurality of neighboring macroblocks, the neighbor data for direct retrieval from a single one of the plurality of data structures that corresponds to a selected macroblock when generating entropy encoded data for the selected macroblock;

wherein storing neighbor data stores neighbor data based on macroblock pairs that include a top frame macroblock and bottom frame macroblock from a frame of the video input signal and a top field macroblock and a bottom field macroblock from a corresponding field of the video input signal.

12. The method of claim 11 wherein neighbor data includes frame below neighbor data for retrieval by a neighboring macroblock in a row below the at least one macroblock when processing in a frame mode and field below neighbor data for retrieval by the neighboring macroblock in a row below the at least one macroblock when processing in a field mode.

13. The method of claim 11 wherein neighbor data includes frame right neighbor data for retrieval by a neighboring macroblock right of the at least one macroblock when processing in frame mode and field right neighbor data for retrieval by the neighboring macroblock right of the at least one macroblock when processing in field mode.

14. The method of claim 11 wherein the video encoder operates in accordance with at least one of, an Advanced Video Coding (AVC) format and a Motion Picture Experts Group (MPEG) format.

15. The method of claim 11 wherein entropy encoded data is generated from discrete transformed coefficients for the plurality of macroblocks in accordance with context-adaptive binary arithmetic coding.

\* \* \* \* \*